United States Patent
Schell et al.

(10) Patent No.: US 7,147,930 B2
(45) Date of Patent: Dec. 12, 2006

(54) HEAT-SHRINKABLE PACKAGING FILMS WITH IMPROVED SEALING PROPERTIES AND ARTICLES MADE THEREOF

(75) Inventors: Thomas Andrew Schell, Winneconne, WI (US); Gregory Robert Pockat, Ripon, WI (US)

(73) Assignee: Curwood, Inc., Oshkosh, WI (US)

( * ) Notice: Subject to any disclaimer, the term of this patent is extended or adjusted under 35 U.S.C. 154(b) by 186 days.

(21) Appl. No.: 10/737,302

(22) Filed: Dec. 16, 2003

(65) Prior Publication Data

US 2005/0129969 A1    Jun. 16, 2005

(51) Int. Cl.
   *B32B 27/32* (2006.01)
(52) U.S. Cl. ............... 428/516; 428/476.1; 428/476.9; 428/518; 428/520; 428/910
(58) Field of Classification Search ............... 428/220, 428/516, 476.1, 476.9, 518, 520, 910
   See application file for complete search history.

(56) References Cited

U.S. PATENT DOCUMENTS

| | | | |
|---|---|---|---|
| 3,549,389 A | 12/1970 | Peterson | |
| 3,555,604 A | 1/1971 | Pahlke | |
| 3,579,416 A | 5/1971 | Schrenik | |
| 3,741,253 A | 6/1973 | Brax | |
| 3,754,063 A | 8/1973 | Schirmer | |
| 3,808,304 A | 4/1974 | Schirmer | |
| 3,900,635 A | 8/1975 | Funderburk, Jr. et al. | |
| 3,924,051 A | 12/1975 | Wiggins et al. | |
| 4,076,698 A | 2/1978 | Anderson et al. | |
| 4,112,181 A | 9/1978 | Baird, Jr. et al. | |
| 4,132,050 A | 1/1979 | Young | |
| 4,182,457 A | 1/1980 | Yamada et al. | |
| 4,196,240 A | 4/1980 | Lustig et al. | |
| 4,198,256 A | 4/1980 | Andrews et al. | |
| 4,205,021 A | 5/1980 | Morita et al. | |
| 4,207,363 A | 6/1980 | Lustig et al. | |
| 4,275,119 A | 6/1981 | Weiner | |
| 4,277,578 A | 7/1981 | Yoshimura et al. | |
| 4,278,738 A | 7/1981 | Brax et al. | |
| 4,302,557 A | 11/1981 | Yoshimura et al. | |
| 4,302,565 A | 11/1981 | Goeke et al. | |

(Continued)

FOREIGN PATENT DOCUMENTS

EP    0 221 762 A2    5/1987

(Continued)

*Primary Examiner*—D. S. Nakarani
(74) *Attorney, Agent, or Firm*—Tom J. Hall

(57) ABSTRACT

A coextruded heat-shrinkable, biaxially-oriented multilayered packaging film comprising a first layer, a second polymer layer, a third polymer layer, and a fourth polymer layer wherein the first polymer layer comprises a first ethylene/α-olefin copolymer preferably, an ethylene/α-olefin copolymer having an α-olefin comprising 4–8 pendant carbon atoms, a melting point of less than 105° C., a molecular weight distribution $M_w/M_n$ of from 1–2.7, a melt index of from 6.5–34 g/10 min. at 190° C., and is present in the first layer is an amount of from 50–100%, based on the total weight of said first layer. The second layer comprises a second ethylene/α-olefin copolymer having a melt index of from 0.85–6.0 g/10 min. Preferably, A is the cumulative total weight percentage of the first ethylene/α-olefin copolymer in all layers of the film and B is the cumulative total weight percentage of the second ethylene/α-olefin copolymer in all layers of the film, such that the relative amounts A and B satisfy the relationship $2A/B \leq 1$. The invention includes a package comprising the coextruded heat-shrinkable, biaxially-oriented multilayered packaging film.

36 Claims, 2 Drawing Sheets

U.S. PATENT DOCUMENTS

| | | |
|---|---|---|
| 4,302,566 A | 11/1981 | Karol et al. |
| 4,329,388 A | 5/1982 | Vicik et al. |
| 4,354,997 A | 10/1982 | Mizutani et al. |
| 4,357,376 A | 11/1982 | Nattinger et al. |
| 4,364,981 A | 12/1982 | Horner et al. |
| 4,379,888 A | 4/1983 | Yoshimura et al. |
| 4,380,567 A | 4/1983 | Shigemoto |
| 4,384,024 A | 5/1983 | Mitchell et al. |
| 4,390,587 A | 6/1983 | Yoshimura et al. |
| 4,399,180 A | 8/1983 | Briggs et al. |
| 4,400,428 A | 8/1983 | Rosenthal et al. |
| 4,424,243 A | 1/1984 | Nishimoto et al. |
| 4,429,079 A | 1/1984 | Shibata et al. |
| 4,430,378 A | 2/1984 | Yoshimura et al. |
| 4,447,480 A | 5/1984 | Lustig et al. |
| 4,456,646 A | 6/1984 | Nishimoto et al. |
| 4,457,960 A | 7/1984 | Newsome |
| 4,469,753 A | 9/1984 | Yoshimura et al. |
| 4,495,249 A | 1/1985 | Ohya et al. |
| 4,501,634 A | 2/1985 | Yoshimura et al. |
| 4,501,798 A | 2/1985 | Koschak et al. |
| 4,511,610 A | 4/1985 | Yazaki et al. |
| 4,514,465 A | 4/1985 | Schoenberg |
| 4,521,437 A | 6/1985 | Storms |
| 4,532,189 A | 7/1985 | Mueller |
| 4,542,075 A | 9/1985 | Schirmer |
| 4,542,886 A | 9/1985 | Yoshimura et al. |
| 4,547,433 A | 10/1985 | Ohya et al. |
| 4,551,380 A | 11/1985 | Schoenberg |
| 4,567,069 A | 1/1986 | Jabarin |
| 4,597,920 A | 7/1986 | Golike |
| 4,600,616 A | 7/1986 | Ohya et al. |
| 4,608,286 A | 8/1986 | Motoishi et al. |
| 4,617,241 A | 10/1986 | Mueller |
| 4,623,567 A | 11/1986 | Hert |
| 4,623,581 A | 11/1986 | Hert |
| 4,640,856 A | 2/1987 | Ferguson et al. |
| 4,643,945 A | 2/1987 | Kiang |
| 4,668,575 A | 5/1987 | Schinkel et al. |
| 4,670,529 A | 6/1987 | Kitamura et al. |
| 4,684,573 A | 8/1987 | Mueller et al. |
| 4,695,491 A | 9/1987 | Kondo et al. |
| 4,699,846 A | 10/1987 | Ohya et al. |
| 4,701,496 A | 10/1987 | Yoshimura et al. |
| 4,705,829 A | 11/1987 | Kwack et al. |
| 4,713,296 A | 12/1987 | Aoyama et al. |
| 4,714,638 A | 12/1987 | Lustig et al. |
| 4,720,427 A | 1/1988 | Clauson et al. |
| 4,724,176 A | 2/1988 | Sun |
| 4,724,185 A | 2/1988 | Shah |
| 4,726,984 A | 2/1988 | Shah |
| 4,732,795 A | 3/1988 | Ohya et al. |
| 4,737,391 A | 4/1988 | Lustig et al. |
| 4,746,562 A | 5/1988 | Fant |
| 4,753,700 A | 6/1988 | Fant |
| 4,755,419 A | 7/1988 | Shah |
| 4,764,404 A | 8/1988 | Genske et al. |
| 4,778,697 A | 10/1988 | Genske et al. |
| 4,788,105 A | 11/1988 | Mueller et al. |
| 4,792,488 A | 12/1988 | Schirmer |
| 4,798,751 A | 1/1989 | Schuetz |
| 4,801,486 A | 1/1989 | Quacquarella et al. |
| 4,801,652 A | 1/1989 | Mizutani et al. |
| 4,803,122 A | 2/1989 | Schirmer |
| 4,824,912 A | 4/1989 | Su |
| 4,832,897 A | 5/1989 | Van der Molen |
| 4,835,218 A | 5/1989 | Yoshimura et al. |
| 4,837,262 A | 6/1989 | Jeon et al. |
| 4,839,235 A | 6/1989 | Shah |
| 4,842,930 A | 6/1989 | Schinkel et al. |
| 4,853,265 A | 8/1989 | Warren |
| 4,859,513 A | 8/1989 | Gibbons et al. |
| 4,863,768 A | 9/1989 | Ishio et al. |
| 4,863,769 A | 9/1989 | Lustig et al. |
| 4,863,784 A | 9/1989 | Lustig et al. |
| 4,880,701 A | 11/1989 | Gibbons et al. |
| 4,886,690 A | 12/1989 | Davis et al. |
| 4,888,222 A | 12/1989 | Gibbons et al. |
| 4,894,107 A | 1/1990 | Tse et al. |
| 4,897,274 A | 1/1990 | Candida et al. |
| 4,913,977 A | 4/1990 | Taka et al. |
| 4,921,733 A | 5/1990 | Gibbons et al. |
| 4,929,476 A | 5/1990 | Gibbons et al. |
| 4,940,612 A | 7/1990 | Gibbons et al. |
| 4,940,634 A | 7/1990 | Mueller et al. |
| 4,948,657 A | 8/1990 | Ogawa et al. |
| 4,966,795 A | 10/1990 | Genske et al. |
| 4,976,898 A | 12/1990 | Lustig et al. |
| 4,977,033 A | 12/1990 | Akao |
| 4,981,739 A | 1/1991 | Gibbons et al. |
| 4,981,760 A | 1/1991 | Naito et al. |
| 4,983,431 A | 1/1991 | Gibbons et al. |
| 4,997,690 A | 3/1991 | Lustig et al. |
| 5,001,016 A | 3/1991 | Kondo et al. |
| 5,004,647 A | 4/1991 | Shah |
| 5,023,121 A | 6/1991 | Pockat et al. |
| 5,023,143 A | 6/1991 | Nelson |
| 5,030,511 A | 7/1991 | Moffitt |
| 5,032,463 A | 7/1991 | Smith |
| 5,037,683 A | 8/1991 | Schirmer |
| 5,041,316 A | 8/1991 | Parnell et al. |
| 5,047,253 A | 9/1991 | Juhl et al. |
| 5,051,266 A | 9/1991 | Juhl et al. |
| 5,055,328 A | 10/1991 | Evert et al. |
| 5,059,481 A | 10/1991 | Lustig et al. |
| 5,061,534 A | 10/1991 | Blemberg et al. |
| 5,066,543 A | 11/1991 | Hwo |
| 5,077,123 A | 12/1991 | Shigemoto |
| 5,079,051 A | 1/1992 | Garland et al. |
| 5,084,352 A | 1/1992 | Percec et al. |
| 5,089,073 A | 2/1992 | Schirmer |
| 5,089,321 A | 2/1992 | Chum et al. |
| 5,128,183 A | 7/1992 | Buzio |
| 5,132,074 A | 7/1992 | Isozaki et al. |
| 5,151,317 A | 9/1992 | Bothe |
| 5,152,946 A | 10/1992 | Gillette |
| 5,158,836 A | 10/1992 | Schirmer et al. |
| 5,162,148 A | 11/1992 | Boye et al. |
| 5,202,188 A | 4/1993 | Bekele |
| 5,206,075 A | 4/1993 | Hodgson, Jr. |
| 5,213,900 A | 5/1993 | Friedrich |
| 5,219,666 A | 6/1993 | Schirmer et al. |
| 5,232,767 A | 8/1993 | Hisazumi et al. |
| 5,234,731 A | 8/1993 | Ferguson |
| 5,241,031 A | 8/1993 | Mehta |
| 5,256,351 A | 10/1993 | Lustig et al. |
| 5,256,428 A | 10/1993 | Lustig et al. |
| 5,270,390 A | 12/1993 | Shibuya et al. |
| 5,272,016 A | 12/1993 | Ralph |
| 5,272,236 A | 12/1993 | Lai et al. |
| 5,278,272 A | 1/1994 | Lai et al. |
| 5,279,872 A | 1/1994 | Ralph |
| 5,283,128 A | 2/1994 | Wilhoit |
| 5,290,635 A | 3/1994 | Matsumura et al. |
| 5,298,326 A | 3/1994 | Norpoth et al. |
| 5,334,428 A | 8/1994 | Dobreski et al. |
| 5,358,792 A | 10/1994 | Mehta et al. |
| 5,360,648 A | 11/1994 | Falla et al. |
| 5,382,470 A | 1/1995 | Vicik |
| 5,397,613 A | 3/1995 | Georgelos |
| 5,397,640 A | 3/1995 | Georgelos et al. |
| 5,403,668 A | 4/1995 | Wilhoit |
| 5,436,041 A | 7/1995 | Murschall et al. |
| 5,460,861 A | 10/1995 | Vicik et al. |

| | | | | | | |
|---|---|---|---|---|---|---|
| 5,491,019 | A | 2/1996 | Kuo | 6,517,950 B1 | 2/2003 | Patrick et al. |
| 5,516,475 | A | 5/1996 | Wilson | 6,761,965 B1 * | 7/2004 | Ferri et al. .................. 428/220 |
| RE35,285 | E | 6/1996 | Quacquarella et al. | 6,773,820 B1 | 8/2004 | Wilhoit et al. |
| 5,538,770 | A | 7/1996 | Bekele | 2001/0028929 A1 | 10/2001 | Breck et al. |
| 5,558,930 | A | 9/1996 | DiPoto | | | |
| 5,562,958 | A | 10/1996 | Walton et al. | | | |

FOREIGN PATENT DOCUMENTS

| | | | |
|---|---|---|---|
| 5,591,390 A | 1/1997 | Walton et al. | |
| 5,593,747 A | 1/1997 | Georgelos | EP 0 292 894 A2 11/1988 |
| 5,595,705 A | 1/1997 | Walton et al. | EP 0 121 336 B1 12/1988 |
| 5,604,043 A | 2/1997 | Ahlgren | EP 0 057 238 B2 2/1989 |
| 5,614,297 A | 3/1997 | Velazquez | EP 0 317 237 A2 5/1989 |
| 5,629,059 A | 5/1997 | Desai et al. | EP 0 206 826 B1 8/1990 |
| 5,635,286 A | 6/1997 | Morita et al. | EP 0 217 252 B1 11/1991 |
| 5,691,049 A | 11/1997 | Morita et al. | EP 0 214 314 B1 5/1992 |
| 5,693,373 A | 12/1997 | Kinsey, Jr. | EP 0 298 700 B1 5/1992 |
| 5,759,648 A | 6/1998 | Idlas | EP 0 374 783 B1 11/1992 |
| 5,811,185 A | 9/1998 | Schreck et al. | EP 0 255 238 B1 12/1992 |
| 5,817,412 A | 10/1998 | Lohmann et al. | EP 0 293 187 B1 1/1993 |
| 5,834,077 A | 11/1998 | Babrowicz | EP 0 405 916 B1 1/1994 |
| 5,837,335 A | 11/1998 | Barbrowicz | EP 0 580 377 A1 1/1994 |
| 5,846,620 A | 12/1998 | Compton | EP 0 240 705 B1 2/1994 |
| 5,852,152 A | 12/1998 | Walton et al. | EP 0 251 769 B1 2/1994 |
| 5,874,139 A | 2/1999 | Boisers et al. | EP 0 586 160 A1 3/1994 |
| 5,962,092 A | 10/1999 | Kuo et al. | EP 0 597 502 A2 5/1994 |
| 5,965,254 A | 10/1999 | Christopherson et al. | EP 0 600 425 B1 6/1994 |
| 6,006,913 A | 12/1999 | Ludemann et al. | EP 0 321 172 B1 5/1996 |
| 6,010,792 A | 1/2000 | Lind et al. | EP 0 450 088 B1 5/1996 |
| 6,017,615 A | 1/2000 | Thakker et al. | EP 0 369 808 B1 6/1996 |
| 6,045,882 A | 4/2000 | Sandford | EP 0 386 720 B1 6/1996 |
| 6,051,292 A | 4/2000 | Lind et al. | EP 0 499 669 B1 12/1997 |
| 6,060,136 A | 5/2000 | Patrick et al. | EP 0 515 795 B1 8/1998 |
| 6,110,549 A | 8/2000 | Hamana et al. | EP 0 334 293 B1 10/1999 |
| 6,159,616 A | 12/2000 | Planeta et al. | EP 0 485 847 B1 3/2000 |
| 6,238,788 B1 | 5/2001 | Bradt | EP 0 707 957 B1 5/2000 |
| 6,270,867 B1 | 8/2001 | Eckstein et al. | EP 0 707 954 B1 11/2001 |
| 6,306,969 B1 | 10/2001 | Patel et al. | WO WO 92/14784 9/1992 |
| 6,316,036 B1 | 11/2001 | Hodson et al. | WO WO 93/02859 2/1993 |
| 6,333,061 B1 | 12/2001 | Vadhar | WO WO 93/03093 2/1993 |
| 6,339,112 B1 | 1/2002 | Kauffman et al. | WO WO 93/08221 4/1993 |
| 6,379,812 B1 | 4/2002 | Hofmesister et al. | WO WO 95/08441 3/1995 |
| 6,437,064 B1 | 8/2002 | Ewchstein et al. | WO WO 95/21743 8/1995 |
| 6,458,469 B1 | 10/2002 | DeLisio et al. | WO WO 98/29249 7/1998 |
| 6,469,103 B1 | 10/2002 | Jain et al. | WO WO 00/76766 12/2000 |
| 6,514,583 B1 | 2/2003 | Ahlgren et al. | |

* cited by examiner

HEAT-SHRINKABLE PACKAGING FILMS WITH IMPROVED SEALING PROPERTIES AND ARTICLES MADE THEREOF

FIELD OF THE INVENTION

The present invention relates to heat-shrinkable films, particularly, biaxially-oriented multilayer, heat-shrinkable films suitable for use in the packaging of products. The present invention is also directed to packages made from such heat-shrinkable films, as well as packaged products utilizing such films.

BACKGROUND OF THE INVENTION

Heat-shrinkable packaging films have found many useful applications in packaging of meats, cheeses, poultry and numerous other food and non-food products. There is always the need for improved heat-shrinkable packaging films and bags or pouches fabricated therefrom, with particular improvement needed in regard to the sealing characteristics, final package quality or appearance and processability relative to multilayered films.

U.S. Pat. No. 4,801,486 to Quacquarella et al. discloses a multilayer heat-shrinkable film suitable for packaging food articles wherein the film may comprise a heat-sealable layer comprising an ethylene/α-olefin copolymer.

U.S. Pat. No. 5,234,731 to Ferguson describes a multilayer heat-shrinkable film structure having at least six layers includes a heat-sealable layer containing a blend of ethylene vinyl acetate copolymer and linear low density polyethylene. The film may also include a first ethylene/α-olefin copolymer in a first core layer and a second ethylene/α-olefin copolymer in a second core layer.

U.S. Pat. No. 5,834,077 to Babrowicz discloses films for packaging products which may be four to twenty layers having in a heat-sealable layer, a first ethylene/α-olefin copolymer and in an outer non-heat-sealable film layer, a second ethylene/α-olefin copolymer. These films may also have an inner heat-sealable layer comprising a blend of a ethylene vinyl acetate copolymer and linear low density polyethylene.

U.S. Pat. No. 6,437,054 to Eckstein et al also describes multilayer heat-shrinkable films with ethylene/α-olefin copolymers. These structures are three or five layers comprising the same ethylene/α-olefin copolymer in an outer or inner layer as is in an internal layer, the same ethylene/α-olefin copolymer in both an outer layer and an inner layer, or the same ethylene/α-olefin copolymer in an outer layer, an inner layer and an internal layer.

SUMMARY OF THE INVENTION

The present invention is directed to a heat-shrinkable, biaxially-oriented multilayered packaging film comprising at least a first polymer layer, a second polymer layer, a third polymer layer, and a fourth polymer layer. The first polymer layer may include a first ethylene/α-olefin copolymer in an amount of from 50–100%, based on the total weight relative to the first layer. Preferably, the first ethylene/α-olefin copolymer is an α-olefin comonomer having between 3–6 pendant carbons atoms and has a melting point of less than 105° C., and a melt index of from 6.5–34 g/10 min at 190° C. In a preferred embodiment of the present invention, the first polymer layer may serve as a heat-sealable layer of the packaging film.

The second polymer layer of the packaging film may include a second ethylene/α-olefin copolymer, preferably, an ethylene/α-olefin copolymer having a melt index of less than 1.5 g/10 min. at 190° C., an ethylene/vinyl acetate copolymer, or a mixture thereof.

In accordance with the present invention, it is preferable that the cumulative total weight percentage of the first ethylene/α-olefin copolymer in all layers of the packaging film, A, and the cumulative total weight percentage of the second ethylene/α-olefin copolymer in all layers of the film, B, where the weight percentages are based on the total film weight, are such that the relative amounts A and B satisfy the relationship $2A/B \leq 1$.

The packaging film of the present invention includes a third layer which may comprise an oxygen barrier selected from the group consisting of ethylene/vinyl alcohol copolymer, polyvinyl chloride, polyvinylidene chloride, polyamide, polyacrylonitrile, copolymers of vinylidene chloride and vinyl chloride or an alkyl acrylate, or a blend thereof. Alternatively, the third polymer layer may comprise a material selected from the group consisting of ionomer, ethylene/α-olefin copolymer, preferably, ethylene/α-olefin copolymer having a melt index of less than 1.5 g/10 min. at 190° C., ethylene/vinyl acetate copolymer, ethylene/methacrylic acid copolymer, ethylene/methyl acrylate copolymer, ethylene/ethyl acrylate copolymer, or a blend thereof.

The inventive multilayered packaging film includes a fourth layer which may comprise a material selected from the group consisting of ionomer, ethylene/α-olefin copolymer, preferably, ethylene/α-olefin copolymer having a melt index of less than 1.5 g/10 min. at 190° C., ethylene/vinyl acetate copolymer, methacrylic acid copolymer, ethylene/methyl acrylate copolymer, ethylene/ethyl acrylate copolymer, anhydride-modified ethylene/vinyl acetate copolymer, anhydride-modified ethylene/α-olefin copolymer, anhydride-modified polyolefin or a blend thereof.

Alternatively, the fourth layer may include an oxygen barrier selected from the group consisting of ethylene/vinyl alcohol copolymer, polyvinyl chloride, polyvinylidene chloride, polyamide, polyacrylonitrile, copolymers of vinylidene chloride and vinyl chloride or alkyl acrylate, or blends thereof.

In accordance with the present invention, the multilayered packaging film has an unrestrained linear thermal shrinkage in the machine direction or the transverse direction of between 20–100% at 85° C. as measured in accordance with ASTM D-2732-96.

The coextruded heat-shrinkable biaxially-oriented multilayered packaging film of the present invention may further comprise a fifth polymer layer of a material selected from the group consisting of ionomer, ethylene/α-olefin copolymer, preferably, an ethylene/α-olefin copolymer having a melt index of less than 1.5 g/10 min. at 190° C., ethylene/vinyl acetate copolymer, anhydride-modified ethylene/vinyl acetate copolymer, ethylene/methyl acrylate copolymer, anhydride-modified ethylene/α-olefin copolymer, anhydride-modified polyolefin or blends thereof.

In accordance with the present invention, the multilayered packaging film may still further include a sixth and a seventh layer. The sixth and seventh layers each may comprise a material selected from the group consisting of ionomer, ethylene/α-olefin copolymer, preferably, an ethylene/α-olefin copolymer having a melt index of less than 1.5 g/10 min. at 190° C., ethylene/vinyl acetate copolymer, anhydride-modified ethylene/vinyl acetate copolymer, ethylene/methacrylic acid copolymer, ethylene/methyl acrylate copolymer, ethylene/ethyl acrylate copolymer, anhydride-modified ethylene/α-olefin copolymer, anhydride-modified polyolefin, or a blend.

Although not essential in the practice of this invention, it may be desirable to cross-link one or more layers of a multilayer embodiment of the inventive film for improvement of abuse and/or puncture resistance and other physical characteristics. This for example may be accomplished by ionizing irradiation using high energy electrons, x-rays, beta particles and the like. The irradiation source can be any electron beam generator operating in a range of about 150 kilovolts to about 6 megavolts with a power output capable of supplying the desired dosage. The voltage can be adjusted to appropriate levels which may be for example 1 to 6 million volts or higher or lower. Many apparatus for irradiation are known to those skilled in the art. A rad is the quantity of ionizing radiation that results in the absorption of 100 ergs of energy per gram of a radiated material, regardless of the source of the radiation. A megarad is $10^6$ rads. (MR is an abbreviation for megarad). Irradiation can be applied to a single film layer such as the outer layer. This type of irradiative cross-linking is described U.S. Pat. No. 3,741,253 to Brax, et al. Alternatively, it may be preferable to irradiate the entire multilayer film, as for example described in U.S. Pat. No. 4,737,391 to Lustig, et al. Those skilled in the art recognize that cross-linking may also be accomplished chemically through utilization of peroxides and the like. A general discussion of crosslinking can be found in the *Encyclopedia of Polymer Science and Technology, Plastics, Resins, Rubbers, Fibers*, John Wiley & Sons, Inc., Vol. 4, pp. 331–414 (1966). This document has a Library of Congress Catalogue Card Number of 64-22188.

The present invention is also directed to a package comprising a coextruded heat-shrinkable, biaxially-oriented multilayered film as described hereinbefore.

DETAILED DESCRIPTION OF THE INVENTION

Figure 1:
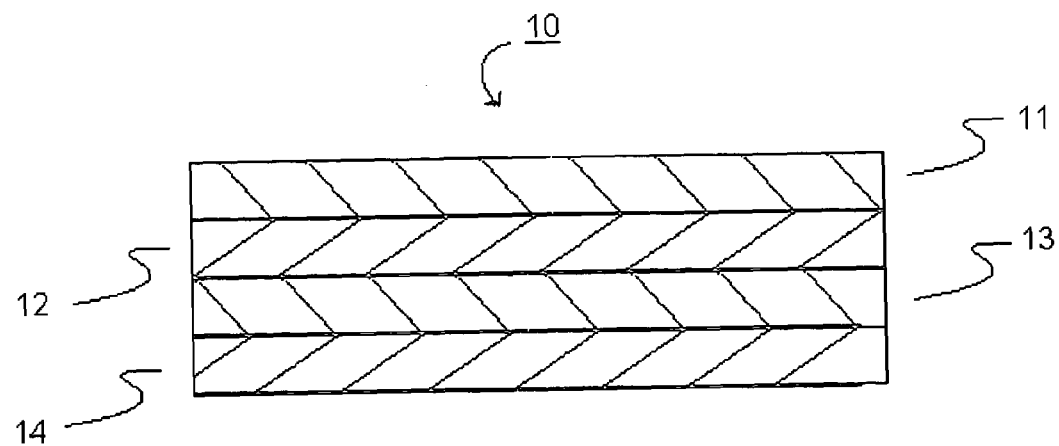
FIG. 1 is a cross-sectional view of one example a multi-layered film having four layers according to the present invention.

As used herein, "heat-shrinkable" is used with reference to the percent dimensional change in a 10 cm×10 cm specimen of film, when at shrunk at 85° C., with the quantitative determination being carried out according to ASTM D-2732-96, as set forth in the *Annual Book of ASTM Standards*, Vol. 08.02, pp. 368–3371 (1990), which is hereby incorporated, in its entirety, by reference thereto. ASTM D-2732-96 covers determination of the degree of unrestrained linear thermal shrinkage at given specimen temperatures of plastic film. Unrestrained linear thermal shrinkage refers to the irreversible and rapid reduction in linear dimension in a specified direction occurring in film subjected to elevated temperatures under conditions where negligible restraint to inhibit shrinkage is present. It is normally expressed as a percentage of the original dimension. The film of the present invention comprises a heat shrinkage in the machine direction or transverse direction of 20–100% at 85° C. as measured in accordance with ASTM D-2732-96.

The term "biaxially-oriented" as used herein, refers to a packaging film which has been elongated in two directions at elevated temperatures followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, biaxially-oriented polymer-containing film to its orientation temperature, heat-shrinkage is produced almost to the original dimensions.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "copolymer" refers to polymers formed by the polymerization of reaction of at least two different monomers. For example, the term "copolymer" includes the co-polymerization reaction product of ethylene and an α-olefin, such as 1-hexene. The term "copolymer" is also inclusive of, for example, the co-polymerization of a mixture of ethylene, propylene, 1-propene, 1-butene, 1-hexene, and 1-octene. As used herein, a copolymer identified in terms of a plurality of monomers, e.g., "ethylene/propylene copolymer", refers to a copolymer in which either monomer may copolymerize in a higher weight or molar percent than the other monomer or monomers. However, the first listed monomer preferably polymerizes in a higher weight percent than the second listed monomer.

As used herein, terminology employing a "/" with respect to the chemical identity of a copolymer (e.g. "an ethylene/propylene copolymer" or "ethylene/α-olefin"), identifies the comonomers which are copolymerized to produce the copolymer.

As used herein, the phrase "ethylene/α-olefin" or "EAO" refer to a modified or unmodified copolymer produced by the co-polymerization of ethylene and any one or more α-olefin. The α-olefin in the present invention has between 3–20 pendant carbon atoms, preferably, 3–12 pendant carbon atoms and more preferably, 3–6 pendant carbon atoms. The co-polymerization of ethylene and an α-olefin may be produced by heterogeneous catalysis, i.e., co-polymerization reactions with Ziegler-Natta catalysis systems, for example, metal halides activated by an organometallic catalyst, i.e., titanium chloride, optionally containing magnesium chloride, complexed to trialkyl aluminum and may be found in patents such as U.S. Pat. No. 4,302,565 to Goeke, et al. and U.S. Pat. No. 4,302,566 to Karol, et al., both of which are hereby incorporated, in their entireties, by reference thereto. Heterogeneous catalyzed copolymers of ethylene and an α-olefin may include linear low density polyethylene, very low density polyethylene and ultra low density polyethylene. These copolymers of this type are available from, for example, The Dow Chemical Company, of Midland, Mich., U.S.A. and sold under the trademark DOWLEX™ resins.

Additionally, the co-polymerization of ethylene and a α-olefin may also be produced by homogeneous catalysis, for example, co-polymerization reactions with metallocene catalysis systems which include constrained geometry catalysts, i.e., monocyclopentadienyl transition-metal complexes taught in U.S. Pat. No. 5,026,798, to Canich, the teachings of which are incorporated herein by reference. Homogeneous catalyzed ethylene/α-olefin copolymers may include modified or unmodified ethylene/α-olefin copolymers having a long-chain branched (8–20 pendant carbons atoms) α-olefin comonomer available from The Dow Chemical Company, known as AFFINITY™ and ATTANE™ resins, TAFMER™ linear copolymers obtainable from the Mitsui Petrochemical Corporation of Tokyo, Japan and modified or unmodified ethylene/α-olefin copolymers having a short-chain branched (3–6 pendant carbons atoms) α-olefin comonomer known as EXACT™ resins obtainable from ExxonMobil Chemical Company of Houston, Tex., U.S.A.

In general, homogeneous catalyzed ethylene/α-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," can be determined by gel permeation chromatography (GPC) where $M_w$ is defined as the weight-average molecular weight and $M_n$ is defined as the number-average molecular weight. The molecular weight determination of polymers and copolymers can be measured as outlined in ASTM D-3593-80, which is incorporated herein in its entirety by reference. Ethylene/α-olefin copolymers of the present invention can be homogeneous catalyzed copolymers of ethylene and an α-olefin which may have a $M_w/M_w$ of less than 2.7, more preferably from about 1.9 to 2.5; still more preferably, from about 1.9 to 2.3. The composition distribution breadth index (CDBI) of the homogeneous catalyzed copolymers of ethylene and an α-olefin will generally be greater than about 70%. This is contrasted with heterogeneous catalyzed copolymers of ethylene and an α-olefin which may have a broad composition distribution index of generally less than 55%. The CDBI is defined as the weight percent of the copolymer molecules having a comonomer content within 50 percent (i.e., plus or minus 50%) of the median total molar comonomer content. The Composition Distribution Breadth Index (CDBI) may be determined via the technique of Temperature Rising Elution Fractionation (TREF) as described by Wild, et al., *Journal of Polymer Science, Poly. Phys. Ed.*, Vol. 20, p. 441 (1982) and U.S. Pat. No. 4,798,081, which are both incorporated herein, in their entireties, by reference. In accordance with the present invention, the first layer may include a first ethylene/α-olefin copolymer having a molecular weight distribution ($M_w/M_n$) of from 1–2.7 as determined by method described by ASTM D-3593-80.

In general, homogeneous catalyzed ethylene/α-olefin copolymers may exhibit an essentially singular melting point characteristic, with a melting point ($T_m$), determined by Differential Scanning Calorimetry (DSC). As used herein, "essentially singular melting point" means that at least about 80%, by weight, of the material corresponds to a single $T_m$ peak. DSC measurements may be made on a Perkin Elmer System 7 Thermal Analysis System according to ASTM D-3418, which is hereby incorporated, in its entirety, by reference thereto. In accordance with the present invention, the first layer may include a first ethylene/α-olefin having a melting point of less than 105° C. as measured by ASTM D-3418.

Homogeneous catalyzed ethylene/α-olefin copolymers of the present invention may have a melt index of from 0.85–100 g/10 min. The first layer of the inventive film may comprise at least a first ethylene/α-olefin copolymer having a melt index of from 3.0–50 g/10 min., and preferably, from 6.5–34 g/10 min. The second layer of the inventive film may comprise a second ethylene/α-olefin copolymer having a melt index of from 0.85–6.0 g/10 min. Melt index is measured according to the test method outlined in ASTM D-1238, Condition 190° C./2.16 kg, which is hereby incorporated, in its entirety, by reference.

As used herein, the phrase "outer-film layer" refers to any film layer of a multilayer film having less than two of its principal surfaces directly adhered to another layer of the film.

As used herein, the phrase "inner-film layer" refers to any layer, of a multilayer film, having both of its principal surfaces directly adhered to another layer of the film.

As used herein, the phrases "heat-sealable layer" or "sealant layer" refer to any layer of a multilayered film where the layer is involved in the sealing of the film to itself, another film layer of the same or another film, and/or another article which is not a film. The heat-sealable layer of the present invention is capable of fusion bonding by conventional indirect means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethough.

As used herein, the term "oxygen barrier layer" refers to a polymeric layer having materials which will control the oxygen permeability of the entire film. For perishable food packaging applications, the oxygen ($O_2$) permeability or transmission rates desirably should be minimized. Typical films are required to have an $O_2$ transmission rates of less than about 20 $cm^3/m^2$ for a 24 hour period at 1 atmosphere, 0% relative humidity and 23° C., preferably less than 15 $cm^3/m^2$, more preferably less than 10 $cm^3/m^2$. Oxygen transmission may be measured according to ASTM D-3985-81 which is incorporated herein by reference. This requirement may be satisfied by numerous well-known oxygen barrier materials in at least one layer of a film, for example, ethylene/vinyl alcohol copolymer, polyvinyl chloride, polyvinylidene chloride, polyamide, polyester, polyacrylonitrile, copolymers of vinylidene chloride and vinyl chloride or alkyl acrylate, or a blend thereof. Preferably, ethylene/vinyl alcohol copolymers are used as an oxygen barrier, more preferably, copolymers of vinylidene chloride and vinyl chloride or alkyl acrylate. The use of a blend of vinylidene chloride and vinylidene chloride/methacrylate copolymers are particularly preferred in the present invention since they provide the advantage of no discoloration on irradiation of the film.

As used herein, the phrase "tie layer" refer to any film layer having the primary purpose of adhering two layers to one another. The tie layer may comprise any polymer, copolymer or blend of polymers having a polar group thereon, or any other polymer, copolymer or blend of polymers which provide sufficient interlayer adhesion to adjacent layers comprising otherwise nonadhering polymers. Suitable materials for use as tie layers in the present invention comprise at least one member selected from the group consisting of ionomer, ethylene/vinyl acetate copolymer, anhydride-modified ethylene/vinyl acetate copolymer, ethylene/methacrylic acid copolymer, ethylene/methyl acrylate copolymer, ethylene/ethyl acrylate copolymer, anhydride-modified ethylene/α-olefin copolymer, anhydride-modified polyolefin, or a blend thereof.

As used herein, the term "anhydride-modified" refers to any form of anhydride functionality, such as the anhydride of maleic acid, fumaric acid, etc., whether co-polymerized with an anhydride-containing monomer with a second, different monomer, grafted onto a polymer or copolymer, or blended with one or more polymers, and is inclusive of derivatives of such functionalities, such as acids, esters, and metal salts derived therefrom.

As used herein, "abuse layer" refers to any layer of a multilayered film that serves to resist abrasion, puncture, and other potential causes of reduction of package integrity, as well as potential causes of reduction of package appearance quality.

The multilayered films of the present invention may be made by any suitable and known film-making process, e.g., cast or blown through either an annular or flat die, and is preferably fully coextruded. As used herein, the term "coextruded" refers to the process of extruding two or more materials through a single die with two or more orifices arranged so that the extrudates merge and weld together into a laminar structure before chilling and solidifying. The film of the present invention may be generally prepared from dry resins which are melted in an extruder and passed trough a die to form the primary film material, most commonly in a tube form. The well-known two step "double bubble" or trapped bubble process may be used to prepare the packaging films of the present invention.

One embodiment of the double bubble process is described in U.S. Pat. No. 3,456,044 to Pahlke, which is incorporated herein by reference. In the Pahlke-type double bubble process a primary tube is extruded, cooled, reheated and the tube is simultaneously stretched in the machine direction by operating longitudinally spaced nip rolls at different speeds, and in the transverse direction by inflating air inside the tube. Suitable stretch ratios are from about 2 to about 6 with ratios of about 3 to about 5 preferred. In the multilayered films of the present invention, all layers were simultaneously coextruded, cooled via water, chilled metal roll, or air quenching, and then reheated for biaxial orientation.

Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well known additives such as processing aids, slip agents, anti-blocking agents and pigments, and mixtures thereof may be incorporated into the film, by blending prior to extrusion. The resins and any additives are introduced to an extruder where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

In the practice of this invention, it may be desirable to irradiated one layer or more or the entire film to cause crosslinking of at least one layer of the film to improve the abuse and/or puncture resistance and other physical characteristics of the film. Crosslinking is the predominant reaction which occurs on irradiation of many polymers and results in the formation of carbon-carbon bonds between polymer chains. Crosslinking may be accomplished, for example, by irradiation using high energy electrons, gamma-rays, beta particles and the like. The irradiation source can be any electron beam generator operating in a range of about 150 kilovolts to about 6 megavolts with a power output capable of supplying the desired dosage. The voltage can be adjusted to appropriate levels which may be for example 1 to 6 million volts or higher or lower. Many apparatus for irradiating films are known to those skilled in the art. Preferably the film is irradiated at a level of from 2–12 MRads, more preferably 2–5 MRads. The most preferred amount of radiation is dependent upon the film and its end use.

One method for determining the degree of "cross-linking" or the amount of radiation absorbed by a material is to measure the gel content in accordance with ASTM D 2765-01 which is hereby incorporated, in its entirety, by reference. Gel content corresponds to the relative extent of crosslinking within a polymeric material having undergone irradiation. Gel content is expressed as a relative percent (by weight) of the polymer having formed insoluble carbon-carbon bonds between polymer. If it is desirable to irradiate the present invention, then at least one layer of the multilayer packaging film has a gel content of not less than 5%, preferably, not less than 10%, and more preferably, not less than 20%.

Preferably, the coextruded heat-shrinkable, biaxially-oriented multilayered packaging film of the present invention can have any total film thickness desired, preferably thicknesses may range between 1–10 mils, more preferably 2–5 mils, most preferably 2–3 mils.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Referring now to FIG. 1, film 10 represents one example of a four-layer embodiment of the present invention. Film 10 is depicted having a first layer 11 which is a first outer-film layer and serves as a sealant layer, a second layer 12 which is an inner-film layer and functions as a tie layer to bond first layer 11 to third layer 13, third layer 13 which is also an inner-film and serves as an oxygen barrier layer, and fourth layer 14 which can be a second outer-film layer functioning as an abuse layer.

First layer 11 includes a first homogeneous catalyzed ethylene/α-olefin copolymer which includes an α-olefin having 3–6 pendant carbon atoms (EAO-1). Preferably, layer 11 comprises an ethylene/α-olefin copolymer having a melting point of less than 105° C., a molecular weight distribution $M_w/M_n$ of from 1–2.7, and a melt index of from 6.5–34 g/10 min. at 190° C. The first ethylene/α-olefin copolymer may be present in layer 11 in an amount from 50–100% based on the total weight of the first layer 11. An example of a commercially available ethylene/α-olefin copolymer which includes an α-olefin having 3–6 pendant carbon atoms and exhibits the desired characteristics as described above is EXACT™ 3139 provided by ExxonMobil Chemical Company of Houston, Tex., U.S.A.

Layers 12 and 14 of film 10 each comprise two second homogeneous catalyzed ethylene/α-olefin copolymer (EAO-2 and EAO-3) all having a melt index of from 0.85–6.0 g/10 min. at 190° C. and an ethylene/vinyl acetate copolymer (EVA). Commercially available examples of the ethylene/α-olefin copolymer with the desired melt index are EXACT™ 4053 and SLP-9523, both supplied by Exxon- Mobil Chemical Company of Houston, Tex., U.S.A. An example of a commercially available a ethylene/vinyl acetate copolymer (EVA) is ESCORENE™ ULTRA by ExxonMobil Chemical Company of Houston, Tex., U.S.A.

Layer 13 of film 10 comprises an oxygen barrier material of a copolymer of vinylidene chloride and vinyl chloride or alkyl acrylate (PVDC).

Figure 2:
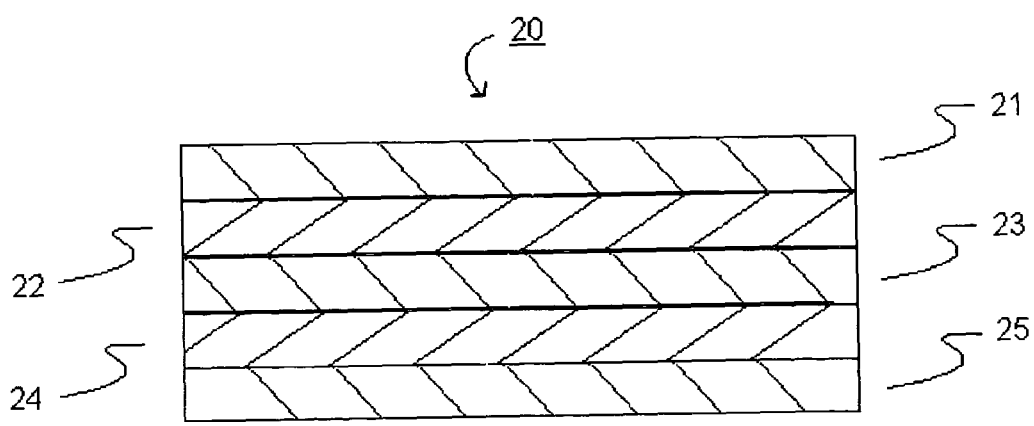
FIG. 2 is a cross-sectional view of one example a multi-layered film having five layers according to the present invention.

Referring now to FIG. 2, film 20 represents one example of a five-layer embodiment according to the present invention. Film 20 is shown having a first layer 21 which is a first outer-film layer and serves as a sealant layer, a second layer 22 is an inner-film layer and functions as a first tie layer to bond first layer 21 to third layer 23, third layer 23 is also an inner-film layer and serves as an oxygen barrier layer, fourth layer 24 is an inner-film layer and functions as a second tie layer to bond third layer 23 to fifth layer 25, and fifth layer 25 is a second outer-film layer which functions as an abuse layer.

Layer 21 comprises a first homogeneous catalyzed ethylene/α-olefin copolymer (EAO-1), preferably, an ethylene/α-olefin copolymer which includes an α-olefin having 3–6 pendant carbon atoms, a melting point of less than 105° C., a molecular weight distribution $M_w/M_n$ of from 1–2.7, and a melt index of from 6.5–34 g/10 min. at 190° C. The first ethylene/α-olefin copolymer in layer 21 may be present in an amount from 50–100% based on the total weight of layer 21. A commercially available example of an ethylene/α-olefin which includes an α-olefin having 3–6 pendant carbon atoms and the desired characteristics as described above is EXACT™ 3139 supplied by ExxonMobil Chemical Company of Houston, Tex., U.S.A.

Layers 22 and 24 each comprise three second homogeneous catalyzed ethylene/α-olefin copolymer (EAO-2, EAO-3 and EAO-4) all having a melt index of from 0.85–6.0 g/10 min. at 190° C., ethylene/vinyl acetate copolymer (EVA), anhydride-grafted ethylene/vinyl acetate copolymer, anhydride-modified ethylene/α-olefin copolymer, anhydride-modified polyolefin, or a blend thereof. Commercially available examples of the ethylene/α-olefin copolymer with the desired melt index include SLP-9523 supplied by ExxonMobil Chemical Company, AFFINITY™ VP 8770 provided by The Dow Chemical Company, and PLEXAR™ PX 3080 supplied by Equistar Chemical Company.

Layer 23 of film 20 comprises an oxygen barrier material of a copolymer of vinylidene chloride and vinyl chloride or alkyl acrylate (PVDC).

While Layer 25 includes two second homogeneous catalyzed ethylene/α-olefin copolymer (EAO-2 and EAO-3) all having a melt index of from 0.85–6.0 g/10 min. at 190° C., and an ethylene/vinyl acetate copolymer (EVA).

Figure 3:
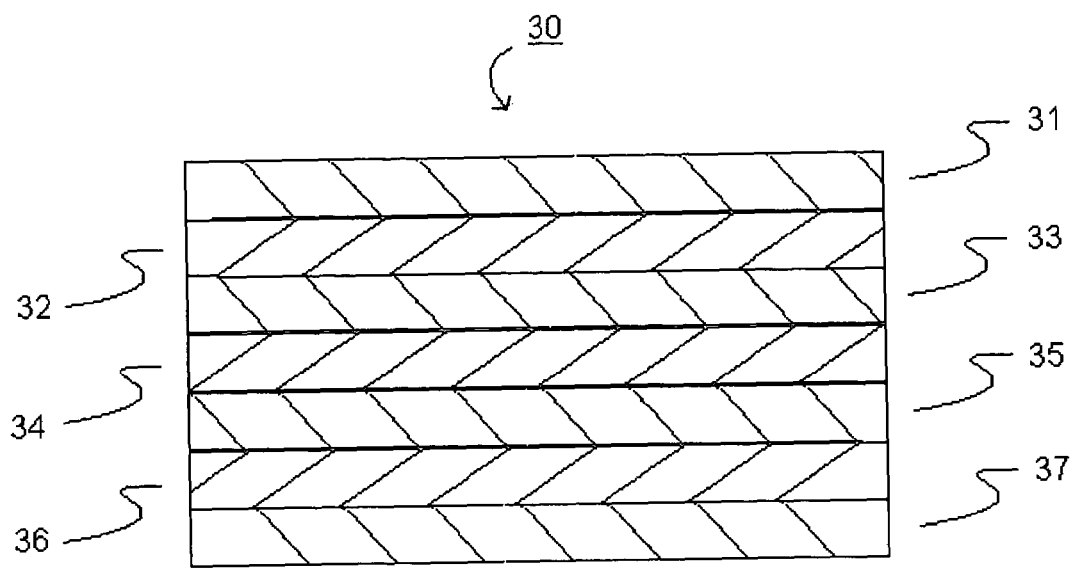
FIG. 3 is a cross-sectional view of one example a multi-layered film having seven layers according to the present invention.

Referring to FIG. 3, film 30 depicts one example of a seven-layer embodiment of the present invention. Film 30 includes a first layer 31 which is a first outer-film layer and serves as a sealant layer, a second layer 32 which is an inner-film layer and functions as a bulk layer, a third layer 33 which is also an inner-film and serves as a tie layer to bond second layer 32 to fourth layer 34, a fourth layer 34 which is an inner-film layer and functions as an oxygen barrier layer, a fifth layer 35 which is a second tie layer and serves to bond fourth layer 34 to sixth layer 36, a sixth layer 36 which is an inner-film layer functioning as a second bulk layer, and a seventh layer 37 which is a second outer-film layer and serves as an abuse layer.

Layer 31 includes a first homogeneous catalyzed ethylene/α-olefin (EAO-1) which includes an α-olefin having 3–6 pendant carbon atoms having identical characteristics as those described hereinabove for layer 11 of film 10 or layer 21 of film 20.

Layers 32, 36, and 37 each comprises two second homogeneous catalyzed ethylene/α-olefin copolymer (EAO-2 and EAO-3) all having a melt index of from 0.85–6.0 g/10 min. at 190° C., and an ethylene/vinyl acetate copolymer (EVA). Commercially available examples of the ethylene/α-olefin copolymer with the desired melt index are EXACT™ 4053 and SLP-9523, both supplied by ExxonMobil Chemical Company of Houston, Tex., U.S.A. An example of a commercially available a ethylene/vinyl acetate copolymer (EVA) is ESCORENE™ ULTRA by ExxonMobil Chemical Company of Houston, Tex., U.S.A.

Layers 33 and 35 each include an ethylene/methacrylate copolymer (EMA) which is commercially obtained from Eastman Chemical Company.

While layer 34 of film 30 comprises a copolymer of vinylidene chloride and vinyl chloride or alkyl acrylate (PVDC), and a blend thereof.

While a specific embodiment of the present invention has been shown and described, it should be apparent that many modifications may be made thereto without departing from the spirit and scope of the invention. Accordingly, the invention is not limited by the foregoing description, but is only limited by the scope of the claims appended thereto. Unless stated otherwise, all percentages, parts, etc. are by weight.

EXAMPLES

The materials used for the layer compositions in Films Nos. 10, 10', 20, and 30 in Table. I, II, II, and IV are identified below:

EAO-1 is an ethylene/hexene copolymer having a density of 0.900 g/cm$^3$, a melt index of 7.5 g/10 min., and a melting point of 95° C. obtained from ExxonMobil Chemical Company of Houston, Tex., U.S.A. and sold under the trademark EXACT™ 3139.

EAO-2 is an ethylene/butene copolymer having a density of 0.888 g/cm$^3$, a melt index of 2.2 g/10 min., and a melting point of 70° C. obtained from ExxonMobil Chemical Company of Houston, Tex., U.S.A. and sold under the trademark EXACT™ 4053.

EAO-3 is an ultra low-density ethylene/octene copolymer having a density of 0.912 g/cm$^3$, a melt index of 1.0 g/10 min., and a melting point of 123° C. obtained from The Dow Chemical Company, Midland, Mich., U.S.A. and sold under experimental number XU61520.01.

EAO-4 is an ethylene/octene copolymer having a density of 0.885 g/cm$^3$, a melt index of 1.0 g/10 min., and a melting point of 74° C. obtained from The Dow Chemical Company, Midland, Mich., U.S.A. and sold under the trademark AFFINITY™ VP 8770.

EAO-5 is an anhydride-modified linear low-density polyethylene copolymer having a density of 0.910 g/cm$^3$, and a melt index of 1.8 g/10 min., obtained from Equistar Chemical Company, Houston, Tex., U.S.A. and sold under the trademark PLEXAR® PX 3080.

EAO-6 is an ultra low-density ethylene/octene copolymer having a density of 0.905 g/cm$^3$, a melt index of 0.8 g/10 min., and a melting point of 123° C. obtained from The Dow Chemical Company, Midland, Mich., U.S.A. and sold under the trademark ATTANE™ 4203.

EAO-7 is an ultra low-density ethylene/octene copolymer having a density of 0.912 g/cm$^3$, a melt index of 0.5 g/10 min., and a melting point of 123° C. obtained from The Dow Chemical Company, Midland, Mich., U.S.A. and sold under the experimental number XU61509.32.

The EVA is an ethylene/vinyl acetate copolymer having a vinyl content of 10.5% (by weight), a density of 0.932 g/cm$^3$, a melt index of 0.2 g/10 min., and a melting point of 96° C. which is obtained from ExxonMobil Chemical Company of Houston, Tex., U.S.A. and sold under the trademark ESCORENE™ ULTRA.

The PVDC blend is a commercially available mixture of 15% (by weight) vinylidene chloride/methacrylate copolymer and 85% (by weight) vinylidene chloride/vinyl chloride copolymer as described in U.S. Pat. No. 4,798,751 to Schuetz, which is incorporated herein by reference in its entirety.

The EMA is an ethylene/methacrylate copolymer having a methyl acrylate content of 22% (by weight), a density of 0.948 g/cm$^3$, a melt index of 2.0 g/10 min., and a melting point of 93° C. which is obtained from Eastman Chemical Company of Kingsport, Tenn., U.S.A. and sold under the trade name EMAC+SP1330.

One preferred embodiment of the present invention has a physical structure, in terms of number of layers, layer thickness, layer arrangement, and a chemical composition in terms of the various polymers, etc., present in each of the layers, as set forth in Table I, below. This film is herein designated "Film 10" as illustrated in the cross-sectional schematic in FIG. 1 and is an example of a coextruded heat-shrinkable, biaxially-oriented multilayered packaging film according to the present invention having a four-layered structure.

TABLE I

Characteristics of Film No. 10

| FIG 1. Layer Designation | Layer Function | Layer Composition | Layer Thickness |
|---|---|---|---|
| 11 | Sealant | 90% EAO-1<br>10% Additives | 20% |
| 12 | Tie | 37% EVA<br>33% EAO-2<br>24% EAO-3<br>6% Additives | 42% |
| 13 | O$_2$ Barrier | 100% PVDC Blend | 10.5% |
| 14 | Abuse | 40% EVA<br>33% EAO-2<br>25% EAO-3<br>2% Additives | 7.5% |

In Table I, the total film thickness of Film No. 10 was approximately 2.0 mils.

A second preferred embodiment, designated as "Film 10'" herein as set forth in Table II, is illustrated in the cross-sectional schematic in FIG. 1, and is an alternative example of at four-layered structure of the present invention.

TABLE II

Characteristics of Film No. 10'

| FIG 1. Layer Designation | Layer Function | Layer Composition | Layer Thickness |
|---|---|---|---|
| 11' | Sealant | 94% EAO-1<br>6% Additives | 20.0% |
| 12' | Tie | 71% EAO-6<br>23% EVA<br>6% Additives | 37.0% |
| 13' | O$_2$ Barrier | 100% PVDC Blend | 17.7% |
| 14' | Abuse | 70% EAO-6<br>27% EVA<br>3% Additives | 25.3% |

In Table II, the total film thickness of Film No. 10' was approximately 2.0 mils.

A third preferred embodiment of the present invention is an example of a five-layer structure, designated as "Film 20" is illustrated in the cross-sectional schematic in FIG. 2 and is set forth in TABLE III.

TABLE III

Characteristics of Film No. 20

| FIG 2. Layer Designation | Layer Function | Layer Composition | Layer Thickness |
|---|---|---|---|
| 21 | Sealant | 94% EAO-1<br>6% Additives | 15% |
| 22 | Tie | 48% EAO-4<br>30% EAO-5<br>19% EAO-7<br>4% Additives | 46.5% |
| 23 | O$_2$ Barrier | 100% PVDC Blend | 10.5% |
| 24 | Tie | 49% EAO-4<br>30% EAO-5<br>19% EAO-7<br>2% Additives | 20.5% |
| 25 | Abuse | 40% EVA<br>33% EAO-2<br>25% EAO-7<br>2% Additives | 7.5% |

In Table III, the total film thickness of Film No. 20 was approximately 2.0 mils.

A fourth preferred embodiment of the present invention is an example of a seven-layer structure, designated as "Film 30" which is illustrated in the cross-sectional schematic in FIG. 3 and is set forth in TABLE IV.

TABLE IV

Characteristics of Film No. 30

| FIG 3. Layer Designation | Layer Function | Layer Composition | Layer Thickness |
|---|---|---|---|
| 31 | Sealant | 90% EAO-1<br>10% Additives | 15% |
| 32 | Bulk | 37% EVA<br>33% EAO-2<br>24% EAO-3<br>6% Additives | 27.3% |
| 33 | Tie | 100% EMA | 15% |
| 34 | O$_2$ Barrier | 100% PVDC Blend | 17.7% |
| 35 | Tie | 100% EMA | 10% |
| 36 | Bulk | 40% EVA<br>33% EAO-2<br>25% EAO-3<br>2% Additives | 7.5% |
| 37 | Abuse | 40% EVA<br>33% EAO-2<br>25% EAO-3<br>2% Additives | 7.5% |

In Table IV, the total film thickness of Film No. 30 was approximately 2.5 mils.

Unless otherwise noted, the physical properties and performance characteristics reported herein were measured by test procedures similar to the following methods.

| | |
|---|---|
| Density | ASTM D-1505 |
| Unrestrained Linear Thermal Shrinkage | ASTM D-2732-96 |
| Molecular Weight | ASTM D-3593-80 |
| Melting Point | ASTM D-3418 |
| Melt Index | ASTM D-1238 |
| Oxygen Transmission Rate | ASTM D-3985-81 |
| Gel Content | ASTM D 2765-01 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A coextruded heat-shrinkable, biaxially-oriented multilayered packaging film comprising;
   (a) a first layer, a second polymer layer, a third polymer layer, and a fourth polymer layer;
   (b) wherein said first polymer layer comprises a first ethylene/α-olefin copolymer having an α-olefin comprising 4–8 pendant carbon atoms, wherein said first ethylene/α-olefin copolymer has:
      (i) a melting point of less than 105° C. as measured in accordance with ASTM D-3418;
      (ii) a first ethylene/α-olefin copolymer having a molecular weight distribution $M_w/M_n$ of from 1.9 to 2.7 as measured in accordance with ASTM D-3593-80;
      (iii) a melt index of from 6.5–34 g/10 min. at 190° C. as measured in accordance with ASTM D-1238 Condition 190° C./2.16 kg;
   (c) wherein said first ethylene/α-olefin copolymer is present in said first layer is an amount of from 50–100%, based on the total weight of said first layer;
   (d) wherein said second layer comprises a second ethylene/α-olefin copolymer having a melt index of from 0.85–6.0 g/10 min as measured in accordance with ASTM D-1238, Condition 190° C./2.16 kg;
   (e) wherein A is the cumulative total weight percentage of said first ethylene/α-olefin copolymer in all layers of said film and B is the cumulative total weight percentage of said second ethylene/α-olefin copolymer in all layers of said film, said weight percentages being based on the total film weight, such that the relative amounts A and B satisfy the relationship $2A/B \leq 1$; and
   (f) wherein said packaging film has an unrestrained linear thermal shrinkage in the machine direction or the transverse direction of between 20–100% at 85° C. as measured in accordance with ASTM D-2732-96.

2. A coextruded heat-shrinkable, biaxially-oriented multilayered packaging film according to claim 1; wherein said first layer is a heat-sealable outer-surface layer.

3. A coextruded heat-shrinkable, biaxially-oriented multilayered packaging film according to claim 1; wherein said film has a total thickness less than 10 mils.

4. A coextruded heat-shrinkable, biaxially-oriented multilayered packaging film according to claim 3; wherein said film has a total thickness less than 5 mils.

5. A coextruded heat-shrinkable, biaxially-oriented multilayered packaging film according to claim 1; wherein said third layer is an oxygen barrier layer or a non-oxygen barrier layer.

6. A coextruded heat-shrinkable, biaxially-oriented multilayered packaging film according to claim 5; wherein said oxygen barrier layer comprises a material selected from the group consisting of ethylene/vinyl alcohol copolymer, polyvinyl chloride, polyvinylidene chloride, polyamide, polyacrylonitrile, copolymers of vinylidene chloride and vinyl chloride or alkyl acrylate, and a blend thereof.

7. A coextruded heat-shrinkable, biaxially-oriented multilayered packaging film according to claim 5; wherein said non-oxygen barrier layer is selected from the group consisting of ionomer, ethylene/α-olefin copolymer, ethylene/vinyl acetate copolymer, anhydride-modified ethylene/vinyl acetate copolymer, ethylene/methyl acrylate copolymer, ethylene/ethyl acrylate copolymer, anhydride-modified ethylene/α-olefin copolymer, anhydride-modified polyolefin and blends thereof.

8. A coextruded heat-shrinkable, biaxially-oriented multilayered packaging film according to claim 7; wherein said ethylene/α-olefin copolymer has a melt index of from 0.85–6.0 g/10 min. at 190° C. as measured in accordance with ASTM D-1238 Condition 190° C./2.16 kg.

9. A coextruded heat-shrinkable, biaxially-oriented multilayered packaging film according to claim 1; further comprising a fifth layer.

10. A coextruded heat-shrinkable, biaxially-oriented multilayered packaging film according film according to claim 1; further comprising a sixth layer.

11. A coextruded heat-shrinkable, biaxially-oriented multilayered packaging film according film according to claim 1; further comprising a seventh layer.

12. A coextruded heat-shrinkable, biaxially-oriented multilayered packaging film according to claim 1; wherein said film is irradiated to a level such that at least one layer of said film has a gel content of less than 5% as measured in accordance with ASTM D 2765-01.

13. A coextruded heat-shrinkable, biaxially-oriented multilayered packaging film according to claim 1; wherein said film is irradiated to a level such that at least one layer of said film has a gel content of not less than 5% as measured in accordance with ASTM D 2765-01.

14. A coextruded heat-shrinkable, biaxially-oriented multilayered packaging film according to claim 13; wherein said film is irradiated to a level such that at least one layer of said film has a gel content of not less than 10% as measured in accordance with ASTM D 2765-01.

15. A coextruded heat-shrinkable, biaxially-oriented multilayered packaging film according to claim 14; wherein said film is irradiated to a level such that at least one layer of said film has a gel content of not less than 20% as measured in accordance with ASTM D 2765-01.

16. A coextruded heat-shrinkable, biaxially-oriented multilayered packaging film according to claim 1; wherein said film forms a package.

17. A coextruded heat-shrinkable, biaxially-oriented multilayered packaging film comprising:
   (a) a first layer, a second polymer layer, a third polymer layer, a fourth polymer layer, and a fifth polymer layer;
   (b) wherein said first polymer layer is a heat-sealable outer-surface layer and comprises a first ethylene/α-olefin copolymer having an α-olefin comprising 4–8 pendant carbon atoms, wherein said first ethylene/α-olefin copolymer has:
      (i) a melting point of less than 105° C. as measured in accordance with ASTM D-3418;
      (ii) a first ethylene/α-olefin copolymer having a molecular weight distribution $M_w/M_n$ of from 1.9 to 2.7 as measured in accordance with ASTM D-3593-80;
      (iii) a melt index of from 6.5–34 g/10 min. at 190° C. as measured in accordance with ASTM D-1238 Condition 190° C./2.16 kg;
   (c) wherein said second layer comprises a second ethylene/α-olefin copolymer having a melt index of from 0.85–6.0 g/10 min as measured in accordance with ASTM D-1238, Condition 190° C./2.16 kg;
   (d) wherein A is the cumulative total weight percentage of said first ethylene/α-olefin copolymer in all layers of said film and B is the cumulative total weight percentage of said second ethylene/α-olefin copolymer in all layers of said film, said weight percentages being based on the total film weight, such that the relative amounts A and B satisfy the relationship 2A/B≦1; and (e) wherein said packaging film has an unrestrained linear thermal shrinkage in the machine direction or the transverse direction of between 20–100% at 85° C. as measured in accordance with ASTM D-2732-96.

18. A coextruded heat-shrinkable, biaxially-oriented multilayered packaging film according to claim 17; wherein said film has a total thickness less than 10 mils.

19. A coextruded heat-shrinkable, biaxially-oriented multilayered packaging film according to claim 17; wherein said third layer is an oxygen barrier layer or a non-oxygen barrier layer.

20. A coextruded heat-shrinkable, biaxially-oriented multilayered packaging film according to claim 19; wherein said oxygen barrier layer comprises a material selected from the group consisting of ethylene/vinyl alcohol copolymer, polyvinyl chloride, polyvinylidene chloride, polyamide, polyacrylonitrile, copolymers of vinylidene chloride and vinyl chloride or alkyl acrylate, and a blend thereof.

21. A coextruded heat-shrinkable, biaxially-oriented multilayered packaging film according to claim 19; wherein said non-oxygen barrier layer is selected from the group consisting of ionomer, ethylene/α-olefin copolymer, ethylene/vinyl acetate copolymer, anhydride-modified ethylene/vinyl acetate copolymer, ethylene/methyl acrylate copolymer, ethylene/ethyl acrylate copolymer anhydride-modified ethylene/α-olefin copolymer, anhydride-modified polyolefin and blends thereof.

22. A coextruded heat-shrinkable, biaxially-oriented multilayered packaging film according to claim 21; wherein said ethylene/α-olefin copolymer has a melt index of from 0.85–6.0 g/10 min. at 190° C. as measured in accordance with ASTM D-1238 Condition 190° C./2.16 kg.

23. A coextruded heat-shrinkable, biaxially-oriented multilayered packaging film according film according to claim 17; further comprising a sixth layer.

24. A coextruded heat-shrinkable, biaxially-oriented multilayered packaging film according film according to claim 17; further comprising a seventh layer.

25. A coextruded heat-shrinkable, biaxially-oriented multilayered packaging film according to claim 17; wherein said film is irradiated to a level such that at least one layer of said film has a gel content of less than 5% as measured in accordance with ASTM D 2765-01.

26. A coextruded heat-shrinkable, biaxially-oriented multilayered packaging film according to claim 17; wherein said film is irradiated to a level such that at least one layer of said film has a gel content of not less than 5% as measured in accordance with ASTM D 2765-01.

27. A coextruded heat-shrinkable, biaxially-oriented multilayered packaging film according to claim 26; wherein said film is irradiated to a level such that at least one layer of said film has a gel content of not less than 10% as measured in accordance with ASTM D 2765-01.

28. A coextruded heat-shrinkable, biaxially-oriented multilayered packaging film according to claim 17; wherein said film forms a package.

29. A coextruded heat-shrinkable, biaxially-oriented multilayered packaging film comprising:

(a) a first layer, a second polymer layer, a third polymer layer, a fourth polymer layer, a fifth polymer layer, sixth polymer layer, and a seventh polymer layer;

(b) wherein said first polymer layer is a heat-sealable outer-surface layer and comprises a first ethylene/α-olefin copolymer having an α-olefin comprising 4–8 pendant carbon atoms, wherein said first ethylene/α-olefin copolymer has:

(i) a melting point of less than 105° C. as measured in accordance with ASTM D-3418;

(ii) a first ethylene/α-olefin copolymer having a molecular weight distribution $M_w/M_n$ of from 1.9 to 2.7 as measured in accordance with ASTM D-3593-80;

(iii) a melt index of from 6.5–34 g/10 min. at 190° C. as measured in accordance with ASTM D-1238 Condition 190° C./2.16 kg;

(c) wherein said second layer comprises a second ethylene/α-olefin copolymer having a melt index of from 0.85–6.0 g/10 min as measured in accordance with ASTM D-1238, Condition 190° C./2.16 kg;

(d) wherein A is the cumulative total weight percentage of said first ethylene/α-olefin copolymer in all layers of said film and B is the cumulative total weight percentage of said second ethylene/α-olefin copolymer in all layers of said film, said weight percentages being based on the total film weight, such that the relative amounts A and B satisfy the relationship 2A/B≦1; and (e) wherein said packaging film has an unrestrained linear thermal shrinkage in the machine direction or the transverse direction of between 20–100% at 85° C. as measured in accordance with ASTM D-2732-96.

30. A coextruded heat-shrinkable, biaxially-oriented multilayered packaging film according to claim 29; wherein said film has a total thickness less than 5 mils.

31. A coextruded heat-shrinkable, biaxially-oriented multilayered packaging film according to claim 29; wherein said third polymer layer, said polymer fifth layer, said sixth polymer layer, and said seventh polymer layer each comprise at least one material selected from the group consisting of ionomer, ethylene/α-olefin copolymer, ethylene/vinyl acetate copolymer, anhydride-modified ethylene/vinyl acetate copolymer, ethylene/methyl acrylate copolymer, ethylene/ethyl acrylate copolymer anhydride-modified ethylene/α-olefin copolymer, anhydride-modified polyolefin and blends thereof.

32. A coextruded heat-shrinkable, biaxially-oriented multilayered packaging film according to claim 29; wherein said ethylene/α-olefin copolymer has a melt index of from 0.85–6.0 g/10 min. at 190° C. as measured in accordance with ASTM D-1238 Condition 190° C./2.16 kg.

33. A coextruded heat-shrinkable, biaxially-oriented multilayered packaging film according to claim 29; wherein said fourth layer is an oxygen barrier layer selected from the group consisting of ethylene/vinyl alcohol copolymer, polyvinyl chloride, polyvinylidene chloride, polyamide, polyacrylonitrile, copolymers of vinylidene chloride and vinyl chloride or alkyl acrylate, and a blend thereof.

34. A coextruded heat-shrinkable, biaxially-oriented multilayered packaging film according to claim 29; wherein said film is irradiated to a level such that at least one layer of said film has a gel content of less than 5% as measured in accordance with ASTM D 2765-01.

35. A coextruded heat-shrinkable, biaxially-oriented multilayered packaging film according to claim 29; wherein said film is irradiated to a level such that at least one layer of said film has a gel content of not less than 20% as measured in accordance with ASTM D 2765-01.

36. A coextruded heat-shrinkable, biaxially-oriented multilayered packaging film according to claim 29; wherein said film forms a package.

* * * * *

UNITED STATES PATENT AND TRADEMARK OFFICE
CERTIFICATE OF CORRECTION

PATENT NO. : 7,147,930 B2  Page 1 of 1
APPLICATION NO. : 10/737302
DATED : December 12, 2006
INVENTOR(S) : Thomas Andrew Schell and Gregory Robert Pockat It is certified that error appears in the above-identified patent and that said Letters Patent is hereby corrected as shown below:

On the title page item (57), Abstract, line 7, "C., a molecular" should read --C., a first ethylene/α-olefin copolymer having a molecular--.
On the title page item (57), Abstract, line 8, "1-2.7" should read --1.9-2.7--.
Column 5, line 49, "1-2.7" should read --1.9-2.7--.

Signed and Sealed this

Fifth Day of August, 2008

JON W. DUDAS
*Director of the United States Patent and Trademark Office*